(12) United States Patent  (10) Patent No.: US 9,171,168 B2
O'Neil et al.  (45) Date of Patent: Oct. 27, 2015

(54) DETERMINE ANOMALIES IN WEB APPLICATION CODE BASED ON AUTHORIZATION CHECKS

(71) Applicant: HEWLETT-PACKARD DEVELOPMENT COMPANY, L.P., Houston, TX (US)

(72) Inventors: Yekaterina Tsipenyuk O'Neil, Sunnyvale, CA (US); Divya Muthukumaran, London (GB); Joy Marie Forsythe, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 15 days.

(21) Appl. No.: 14/041,365

(22) Filed: Sep. 30, 2013

(65) Prior Publication Data

US 2015/0096034 A1  Apr. 2, 2015

(51) Int. Cl.
*G06F 21/57* (2013.01)
(52) U.S. Cl.
CPC ................................ *G06F 21/577* (2013.01)
(58) Field of Classification Search
CPC ............ H04L 9/00; H04L 9/32; G06F 21/577
USPC ........................ 726/25, 4, 7, 17, 11
See application file for complete search history.

(56) References Cited

U.S. PATENT DOCUMENTS

| | | | |
|---|---|---|---|
| 7,815,106 B1* | 10/2010 | McConnell | 235/380 |
| 8,291,490 B1* | 10/2012 | Ahmed et al. | 726/17 |
| 8,321,921 B1* | 11/2012 | Ahmed et al. | 726/7 |
| 8,484,716 B1* | 7/2013 | Hodgson et al. | 726/11 |
| 8,706,800 B1* | 4/2014 | Ahmed et al. | 709/203 |
| 2005/0273854 A1 | 12/2005 | Chess et al. | |
| 2008/0052527 A1* | 2/2008 | Siedlarz | 713/186 |
| 2008/0104663 A1 | 5/2008 | Tokutani et al. | |
| 2008/0104665 A1 | 5/2008 | Naldurg et al. | |
| 2008/0201760 A1 | 8/2008 | Centonze et al. | |
| 2009/0182565 A1* | 7/2009 | Erickson et al. | 705/1 |
| 2010/0071035 A1* | 3/2010 | Budko et al. | 726/4 |
| 2010/0180039 A1* | 7/2010 | Oh et al. | 709/228 |
| 2010/0198730 A1* | 8/2010 | Ahmed et al. | 705/50 |
| 2011/0040824 A1* | 2/2011 | Harm | 709/203 |
| 2011/0041140 A1* | 2/2011 | Harm et al. | 719/318 |
| 2011/0041141 A1* | 2/2011 | Harm et al. | 719/318 |
| 2011/0126282 A1 | 5/2011 | Centonze et al. | |
| 2012/0131645 A1* | 5/2012 | Harm | 726/4 |
| 2014/0341026 A1* | 11/2014 | Gahm et al. | 370/232 |

OTHER PUBLICATIONS

Felmetsger, V. et al., Toward Automated Detection of Logic Vulnerabilities in Web Applications, https://www.usenix.org/legacy/event/sec10/tech/full_papers/Felmetsger.pdf, Jun. 3, 2010.
Muthukumaran, Divya, et al., Leveraging "Choice" to Automate Authorization Hook Placement, pp. 145-156, Oct. 2012.

* cited by examiner

*Primary Examiner* — Haresh N Patel
(74) *Attorney, Agent, or Firm* — Hewlett-Packard Patent Department

(57) ABSTRACT

Example embodiments disclosed herein relate to determining an anomaly of a missing authorization or inconsistent authorization in web application code. The web application code is analyzed to identify methods that have authorization checks associated and labeling the identified methods as related to authorization checks. Unidentified methods are associated as non-authorization check methods. The methods are compared to determine the anomaly.

14 Claims, 3 Drawing Sheets

DETERMINE ANOMALIES IN WEB APPLICATION CODE BASED ON AUTHORIZATION CHECKS

BACKGROUND

Software security testing is used to identify vulnerabilities in an application such as a Web application. Static Code Analysis is the analysis of computer software that is performed without actually executing programs. Dynamic Analysis is the analysis of computer software performed on executing programs.

BRIEF DESCRIPTION OF THE DRAWINGS

The following detailed description references the drawings, wherein.

DETAILED DESCRIPTION

Figure 2:
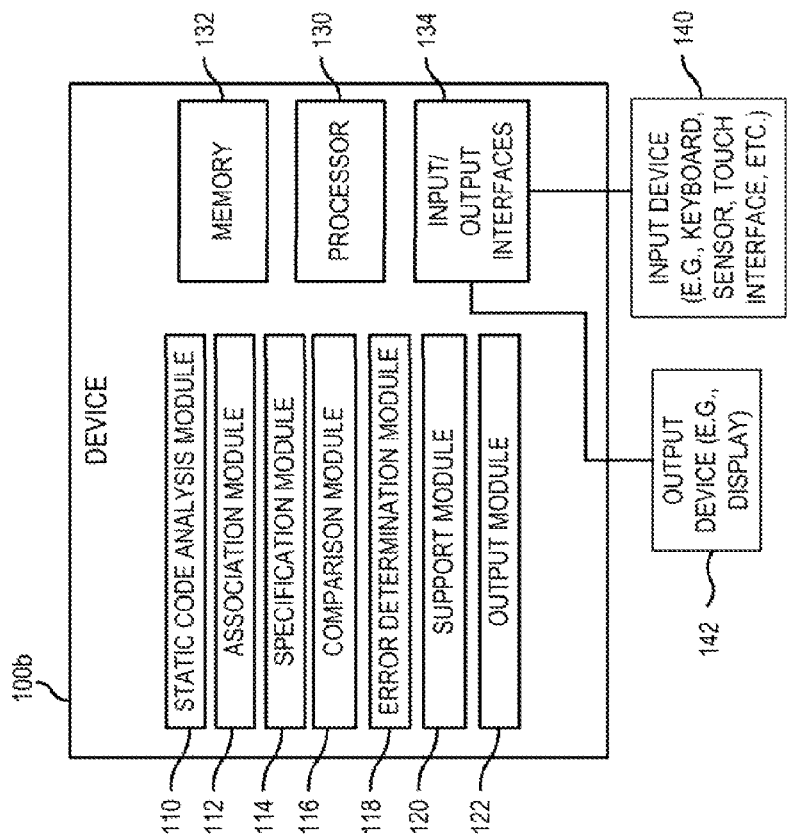
FIGS. 1 and 2 are block diagrams of devices to determine an anomaly in web application code, according to various examples.

Embodiments described herein provide techniques for performing testing of applications, such as web applications. When a company desires to know how secure a web application the company has in production is or going to be put into production, the company often uses a security testing solution. The idea of different types of entities having different privileges has been common since early software systems. As software systems become more ubiquitous and are used for tasks ranging from shopping to medical records, providing secure access control continues to remain important. Gaps in the enforcement of access control policy of a software system can lead to privilege escalation. This may allow unauthorized access to sensitive resources and/or operations.

Correct placement of authorization checks in web applications has challenges. It requires intimate knowledge of the system, its entities and their roles, which is why missing authorization checks is a widespread security vulnerability. Examples of events that may be triggered by such a security vulnerability include leaks to earnings results, leaks of account numbers/names, leaks of records, etc. Accordingly embodiments described herein describe approaches to automatically detect missing and/or inconsistent authorization checks in web applications using, static analysis.

In certain examples, a missing authorization check can be an authorization check that is not present in a method, but the system considers should be present (e.g., because it is present in protecting a method called on the same variable or a variable of the same type in another circumstance). An inconsistent authorization check can be the scenario where an authorization check is present in a method, but the system considers that it is an anomaly because another type of authorization check was used for a similar scenario.

The application code of a web application under test is processed via static analysis. Methods in the application are identified that have authorization checks associated with them (ACMETHODs). Also, methods that do not have associated authorization checks are identified (NACMETHODs). The identification can be based on configuration files, relevant code annotations, programmatic application programming interfaces (APIs), or similar approaches. Specifications are generated for both the ACMETHODs and the NACMETHODs. The specifications can include lists of methods called inside them, variables, classes these methods are called on, combinations thereof, or the like. Anomalies are detected by cross-checking the specifications of NACMETHODs with those of appropriate ACMETHODs. Anomalies that can be considered errors or vulnerabilities can be determined and information about the errors can be collected. The information about the errors (e.g., type of error, location of error, possible approaches to fix the error, etc.) can be generated. This information can be saved in a log, record, output, to a security auditor, or developer, etc.

Advantageously, the approaches provided herein can provide remediation information in order to correct the issues discovered. For example, the location of the code can be provided to a security auditor or developer running the security test. Further, inconsistent authorization checks can be found using these approaches.

Figure 1:
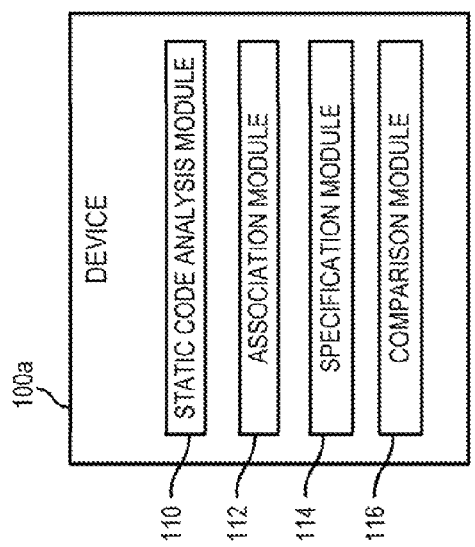

FIGS. 1 and 2 are block diagrams of devices to determine an anomaly in web application code, according to various examples. Devices 100*a*, 100*b* include components that can be utilized to determine one or more anomalies in web application code representative of missing and/or inconsistent authorization. The respective devices 100*a*, 100*b* may be a notebook computer, a desktop computer, a tablet computing device, a wireless device, a server, a workstation, or any other computing device.

Application source code of a web application can be provided to a static code analysis module 110 of the device 100. A static source code analyzer is a program that analyzes applications without actually executing the applications. Static analysis works by constructing a model of the code via parsing either source code or binary files as well as one or more configuration files that accompany the application and applying one or more kinds of analysis techniques (e.g., dataflow, controlflow, etc.) to the model. Static analysis can include multiple phases.

The static code analysis module 110 can analyze the web application code to identify methods in the web application code that have authorization checks associated. This can be based on a configuration file, annotations, programmatic APIs, or combinations thereof. As such, there are several different approaches to specify access control in web applications. For example, JAVA J2EE Banking web applications may use SPRING SECURITY for access control. An association module 112 can associate the identified methods as authorization check methods (ACMETHODs) and one or more non-identified methods of the web application code as non-authorization check methods (NACMETHODs). As such, a mapping between methods used in the application and authorization checks can be made.

Methods that have authorization checks associated with them can be marked. Also, in some examples, classes that have at least one ACMETHOD can be marked as an ACCLASS. Methods in ACCLASS's that are not ACMETHODs can be marked as NACMETHODs.

The static code analysis module 110 can traverse configuration files to collect information about specified authorization checks. For example, Examples 1 and 2 demonstrate 2 different ways access control can be specified in a SPRING SECURITY configuration file.

Example 1

```
<intercept-url pattern="/admin*"
    access="hasRole('admin') and hasIpAddresse
('192.169.1.0/24')"/>
```

Example 2

```
<protect-pointcut       expression="execution(*
com.mycompany.*Service.*(..))"
    access="ROLE_USER"/>
```

Other types of frameworks (e.g., .NET framework, STRUTS framework, etc.) can have similar configuration files that can be used. Configuration files can include information about the authorization checks used by the framework, one or more frameworks, and/or the application specifically. Moreover, the configuration files can be in formats defined by the framework and can be specific to the web application. In the Example 1 case, where <intercept-url/> tag allows the specification of Uniform Resource Locator (URL) patterns to be guarded by access control expressions, a mapping between URL patterns and access checks is created. Then a mapping between all the methods used in the application and URLs is created. Then the mappings are taken together and a mapping between methods used in an application and authorization checks is derived.

For the Example 2 case, where the <protect-pointcut/> tag uses Aspect oriented programming to insert authorization checks before a set of methods that match a pattern, a mapping between pointcut patterns and authorization checks is created. Then methods that exist in an application are mapped to pointcut patterns. Further, the two are taken together to derive the mapping between methods used in an application and authorization checks. Mappings between methods and authorization checks defined in configuration files used in frameworks other than Spring Security can be derived similarly.

Example 3

```
@PreAuthorize("hasRole('ROLE_USER')")
public void create(Contact contact);
```

Additionally or alternatively, information is collected about authorization checks specified via annotations. For example, Example 3 demonstrates one way to define an authorization check (hasRole('ROLE_USER')) on a method using an annotation (@PreAuthorize) on that method (create( )). Annotations can be put on methods themselves, classes and super classes containing these methods, as well as callers of these methods. The set of checks propagated from callers are intersected. If the callers are all doing different things, this might indicate inconsistent authorization.

Programmatic APIs can be used similarly to annotations. For example, consider the following pseudo-code of:

```
if (isAdmin (loggedInUser) ) {
    deleteUser (userToDelete) ;
}
or
if (hasPermission(role, action)) {
    execute (action);
}
```

Here, an authorization check isAdmin( ) is done before the call of method deleteliser( ). Here isAdmin( ) can correspond to the @preAuthorize and deleteUser would be considered an ACMETHOD because it is protected by isAdmin( ). The programmatic APIs can be provided as a specification using annotation or a configuration file or be determined by parsing the code because the naming convention can be descriptive.

A specification module 114 can be used to generate specifications for the ACMETHODs and the NACMETHODs. The respective specifications can include lists of methods of the web application code called within them and associated variables and classes.

To generate specifications for ACMETHODs and NACMETHODs it is determined what security-sensitive operations are performed by access-checked methods so that the specification module 114 has a way of comparing them with the methods that do not have access checks. There are many ways to determine how to gather and represent access checks. For simplicity, method calls inside methods can be used to represent operations. In other examples, other code can be used to represent operations. In one example, security-sensitive operations are method calls and/or assignment statements that happen inside of ACMETHODs. As noted, other approaches to represent operations can be used. For each method call, the specification module 114 extracts the object instance on which that call was made. Then the specification module 114 can compare operations based on whether the operations access the same variable or same type. This would give us four levels of similarity for comparing, operations: SAMEVAR+SAMEMETHOD (same method is called on the same variable), SAMEVAR+DIFFMETHOD (different method is called on the same variable), SAMETYPE+SAMEMETHOD (same method is called on the same type), and SAMETYPE+DIFFMETHOD (different method is called on the same type).

For example, given the code in Example 4 it can be determined that both getCocktail( ) and deleteCocktail( ) perform the operation this.cocktails+get( ). Therefore they fall under the SAMEVAR+SAMEMETHOD category.

Example 4

```
public class CocktailSeryiceImpl implements Cock-
tailService{
    List<Cocktail>cocktails=new ArrayList<Cocktail>( ):
    @PreAuthorize(hasRole('ADMIN'))
    public Cocktail getCocktail(int id){
    return cocktails.get(int);}
    public Cocktail deleteCocktail(int id){
    Cocktail cocktail=cocktails.get(int);
    cocktail.remove(int);
    returncocktail;}}
```

Given the above Example 4, the specification module 114 can create a specification shown in Example 5 for the getCocktail( ) method since it has a security check.

Example 5

```
getCocktail( )
Operations:
    CocktailServiceImpl+this.cocktails+get( )
Access Checks:
    PreAuthorize(hasRole('Admin')).
```

The specification module 114 can do this by manipulating the static analysis module 110 to flag method calls inside ACMETHODs and NACMETHODs and generate "vulnerabilities" to represent them. In one example, for every "vulnerability," the device 100 would collect information about the variable and type the methods are called on.

The comparison module 116 can compare the NACMETHODs to the ACMETHODs to determine at least one anomaly representative of missing authorization, inconsistent authorization, or a combination thereof in the web application code based on the specifications.

In one example, for every NACMETHOD, the comparison module 116 compares the set of operations performed by it against those performed by ACMETHODs. If the comparison module is able to identify matches, then the comparison module 116 marks this NACMETHOD method as being anomalous. Similarly, the error determination module 118 can mark the NACMETHOD as an error based on the comparison. The comparison module 116 can compare operations based on the four categories discussed above.

Once anomalous NACMETHODs are determined, suggestions for remediation can be provided. The support module 120 can determine an approach to correct the error and/or generate information about the error. Such information can include the location of the error, what the error is, why it was determined to be an error, examples of what a programmer could do to correct the error, etc. In one example, the error could be that the NACMETHOD was detected to have a missing or inconsistent authorization check. Various descriptions can be used for why the error was determined. For example, in the case of a missing check, it can be outputted, via the output module 122, that the NACMETHOD performs the same operations as at least one ACMETHOD, and the ACMETHOD(s) has an authorization check. For an inconsistent check, it can be outputted that an ACMETHOD performs the same operations and has a different authorization check. The support module 120 can determine which check to add (if missing) or how to modify an existing check. As such, the output module 122 can output a representation (e.g., an identifier) of the anomaly or anomalies, a reason why the anomaly or anomalies is an error, and the approach to remediate.

For example, Example 6 explains what to do to fix missing authorization check in the code shown in Example 4.

Example 6 deleteCocktail( )
    Add Check:
        PreAuthorize(hasRoler('Admin'))

In this scenario, the function deleteCocktail( ) can be identified as having the error. The "Add Check" can signify both the reason for the anomaly (missing check) and an approach to correct the error by adding the PreAuthorize check to deleteCocktail( ).

A processor 130, such as a central processing unit (CPU) or a microprocessor suitable for retrieval and execution of instructions and/or electronic circuits can be configured to perform the functionality of any of the modules 110, 112, 114, 116, 118, 120, 122 described herein. In certain scenarios, instructions and/or other information, such as configuration files, the web application code, etc., can be included in memory 132 or other memory. Input/output interfaces 134 may additionally be provided by the computing device 100b. For example, input devices 140, such as a keyboard, a touch interface, a mouse, a microphone, etc. can be utilized to receive input from an environment surrounding the computing device 100b. Further, an output device 142, such as a display, can be utilized to present or output information to users. Examples of output devices include speakers, display devices, amplifiers, etc. Moreover, in certain embodiments, some components can be utilized to implement functionality of other components described herein. Input/output devices such as communication devices like network communication devices or wireless devices can also be considered devices capable of using the input/output interfaces 134.

Each of the modules 110, 112, 114, 116, 118, 120, 122 may include, for example, hardware devices including electronic circuitry for implementing the functionality described herein. In addition or as an alternative, each modules 110, 112, 114, 116, 118, 120, 122 may be implemented as a series of instructions encoded on a machine-readable storage medium of device 100 and executable by processor 130. It should be noted that, in some embodiments, some modules are implemented as hardware devices, while other modules are implemented as executable instructions.

With the above approaches, the determination and remediation suggestions are advantageously provided automatically. Further, the detection of issues is done statically rather than at runtime, which means that a running application instance is not required for the testing to be performed. Further, the approaches allow for the detection of inadequate/inconsistent authorization checks for web applications.

Figure 3:
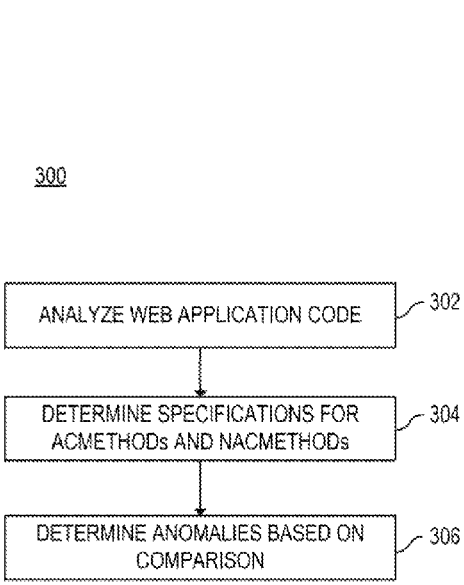
FIG. 3 is a flowchart of a method for determining anomalies in web application code, according to one example.

FIG. 3 is a flowchart of a method for determining anomalies in web application code, according to one example. Although execution of method 300 is described below with reference to device 100, other suitable components for execution of method 300 can be utilized (e.g., computing device 500). Additionally, the components for executing the method 300 may be spread among multiple devices. Method 300 may be implemented in the form of executable instructions stored on a machine-readable storage medium, such as storage medium 520, and/or in the form of electronic circuitry.

A device 100 implementing method 300 may begin by analyzing web application code to identify methods in the web application code that have authorization checks associated with them (302). The identified authorization check methods can be labeled or otherwise marked as authorization check methods (ACMETHODs). Unidentified methods can also be labeled as non-authorization check methods (NACMETHODs). As noted above, the ACMETHODs can be determined based on one or more of a configuration file, annotations, and programmatic APIs.

At 304, specifications for the ACMETHODs and the NACMETHODs can be determined. As noted above, method calls inside methods can be considered operations. Security-sensitive operations can be considered methods that are inside an ACMETHOD. As such, a set of security-sensitive operations performed by the ACMETHODs can be determined. These security-sensitive operations can be marked in the specifications. The respective specifications can include lists of methods of the web application code called within them and associated variables and/or classes.

At 306, at least one anomaly representative of missing authorization and/or inconsistent authorization in the web application code can be determined based on the specifications. This can be based on a comparison of NACMETHODs and ACMETHODs. As noted above, the comparison can be based on whether the respective methods access the same variable and/or the same type. In certain examples, a variable is a storage location and an associated symbolic name that includes some known or unknown quantity or information. Further, in some examples, a type is a classification identifying one of various types of data (e.g., integer, float, Boolean, certain structures, certain classes, etc.). In some examples, certain types may not be used for the comparison. For example, particular structures or classes may be used for the type analysis.

Figure 4:
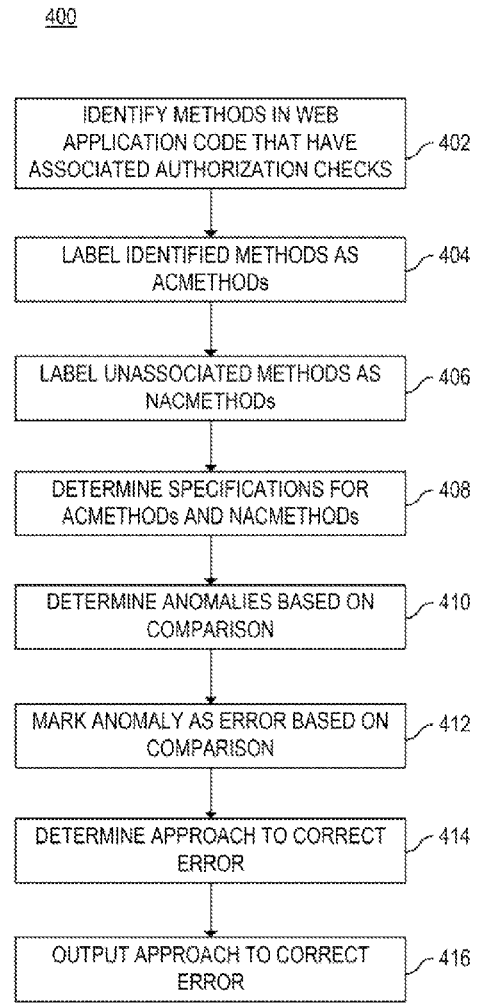
FIG. 4 is a flowchart of a method for determining errors in web application code and suggest approaches to correct errors, according to one example.

FIG. 4 is a flowchart of a method for determining errors in web application code and suggest approaches to correct errors, according to one example. Although execution of method 400 is described below with reference to device 100, other suitable components for execution of method 400 can be utilized (e.g., computing device 500). Additionally, the components for executing the method 400 may be spread among multiple devices. Method 400 may be implemented in the form of executable instructions stored on a machine-readable storage medium, such as storage medium 520, and/or in the form of electronic circuitry.

At 402, the device 100 can analyze web application code to identify methods in the web application code that have authorization checks associated. As noted above, the identification can be based on at least one of a configuration file, annotations, and programmatic APIs. Then, at 404, the identified methods can be labeled as ACMETHODs. The non-identified methods can be labeled as NACMETHODs (406). It should be noted that the marking need not include the strings "ACMETHOD" or "NACMETHOD," but other approaches can be used for the labeling (e.g., a flag or other value).

At 408, specifications for the ACMETHODs and the NACMETHODs can be determined. The specifications can be determined as noted above. For example, a set of security-sensitive operations performed by the ACMETHODs can be determined. The respective security-sensitive operations can be marked in the respective specifications. As noted above, in some scenarios, an operation can be considered a method call within the respective methods.

At 410, the NACMETHODs can be compared to the ACMETHODs to determine one or more anomaly representative of missing authorization and/or inconsistent authorization in the web application code based on the specifications. The comparison can be based on whether the respective methods access the same variable and/or the same type. The comparison can also be based on whether the same method or different method is associated with the variable or type. In one example, if the same variable or type is accessed or written to by an ACMETHOD, it stands to reason that a NACMETHOD accessing or writing to the same variable or type should also be protected. If this protection is missing, the NACMETHOD can be considered to have an anomaly associated. In other examples, the specifications can be used to determine whether the same or different authorizations are used to protect a variable or type. As such, if two different authorization approaches are used to protect a variable or type, the authorization can be considered inconsistent.

At 412, anomalies can be marked as errors based on an analysis of the anomaly. In one scenario, the analysis can include whether there are any exceptions (e.g., a particular type may not wish to be considered an anomaly or error (e.g., because it has broad associated variables)). In some scenarios, basic types (e.g., int, float, etc.) may be considered exceptions. As such, the particular types may not be processed for anomaly detection. A list of anomalies and/or errors can be generated. The list can include the anomalies/errors, the location of the anomalies/errors, a reason for why they are considered anomalies/errors, approaches to correct the error, or combinations thereof. At 414, an approach to correct the error can be determined. As noted above, the approach can be based on what authorization is missing or inconsistent. Then, at 416, the device 100 can output the anomaly or anomalies found. Further, the device 100 can output a reason for why the anomaly is an error, the location of the anomaly, the approach to correct the error, or combinations thereof.

Figure 5:
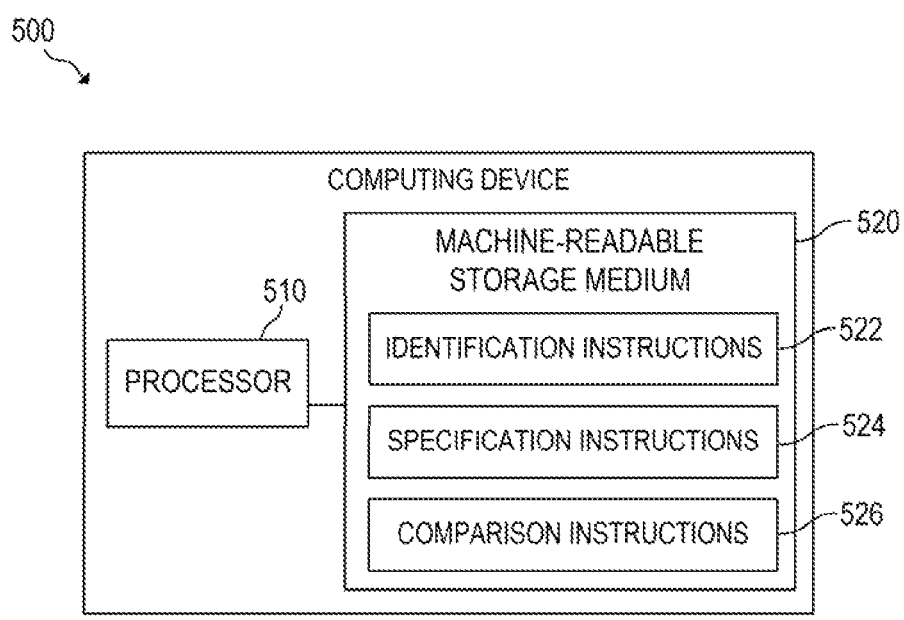
FIG. 5 is a block diagram of a computing device to determine an anomaly in web application code, according to one example.

FIG. 5 is a block diagram of a computing device to determine an anomaly in web application code, according to one example. The computing device 500 includes, for example, a processor 510, and a machine-readable storage medium 520 including instructions 522, 524, 526 for comparing authorization checked methods with non-authorization checked methods to determine missing or inconsistent authorization. Computing device 500 may be for example, a notebook computer, a slate computing device, a portable reading device, a server, a workstation, a desktop computer, or any other computing device.

Processor 510 may be, at least one central processing unit (CPU), at least one semiconductor-based microprocessor, at least one graphics processing unit (GPU), other hardware devices suitable for retrieval and execution of instructions stored in machine-readable storage medium 520, or combinations thereof. For example, the processor 510 may include multiple cores on a chip, include multiple cores across multiple chips, multiple cores across multiple devices (e.g., if the computing device 500 includes multiple node devices), or combinations thereof. Processor 510 may fetch, decode, and execute instructions 522, 524, 526 to implement methods 300 and/or 400. As an alternative or in addition to retrieving and executing instructions, processor 510 may include at least one integrated circuit (IC), other control logic, other electronic circuits, or combinations thereof that include a number of electronic components for performing the functionality of instructions 522, 524, 526.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 120 may be encoded with a series of executable instructions for performing methods 300 and/or 400.

Computing device 500 may execute identification instructions 522 to analyze web application code to identify methods in the web application code that have authorization checks associated and labeling these identified methods as ACMETHODs and labeling unidentified methods as NACMETHODs. The specification instructions 524 can be executed by the processor 510 to determine specifications for the ACMETHODs and the NACMETHODs as described above. Moreover, the comparison instructions 526 can be executed to compare the NACMETHODs to the ACMETHODs to determine at least one anomaly representative of a missing authorization, an inconsistent authorization, or a combination thereof based on the specifications.

What is claimed is:

1. A non-transitory machine-readable storage medium storing instructions that, when executed by at least one processor of a device, cause the device to:
   analyze web application code to identify, in the web application code, methods that have associated authorization checks and labeling the identified methods as authorization check methods (ACMETHODs);
   label unidentified methods in the web application code as non-authorization check methods (NACMETHODs);
   determine specifications for the ACMETHODs and the NACMETHODs;
   compare the specifications of the NACMETHODs to the specifications of the ACMETHODs to determine, based on the specifications, at least one anomaly, each of the at least one anomaly representing a missing authorization in the web application code or inconsistent authorization in the web application code;
   mark each of the at least one anomaly as an error based on an analysis of the at least one anomaly; and output the at least one anomaly or a reason for why the one at least one anomaly is an error.

2. The non-transitory machine-readable storage medium of claim 1, further comprising instructions that, when executed by the at least one processor, cause the device to:
   determine a set of security-sensitive operations performed by the ACMETHODs; and
   mark each security-sensitive operation in the specification of each ACMETHOD that performs the security-sensitive operation.

3. The non-transitory machine-readable storage medium of claim 2, wherein each security-sensitive operation is a method call within the ACMETHOD that performs the security-sensitive operation.

4. The non-transitory machine-readable storage medium of claim 1, wherein the ACMETHODs are identified based on at least one of a configuration file, annotations, or programmatic APIs.

5. The non-transitory machine-readable storage medium of claim 2, wherein each comparison of the specification of a NACMETHOD to the specification of an ACMETHOD is performed in response to determining that the NACMETHOD and ACMETHOD access at least one same variable type.

6. The non-transitory machine-readable storage medium of claim 1, further comprising instructions that, when executed by the at least one processor, cause the device to:
   determine an approach to correct the error; and
   output the approach.

7. A method implemented by at least one processor, the method comprising:
   analyzing, by the at least one processor, web application code to identify, in the web application code, methods that have authorization checks associated;
   labeling, by the at least one processor, the identified methods as authorization check methods (ACMETHODs),
   labeling, by the at least one processor, methods of the web application code that are not associated with the authorization checks as non-authorization check methods (NACMETHODs);
   determining, by the at least one processor, specifications for the ACMETHODs and the NACMETHODs;
   comparing, by the at least one processor, the specifications of the NACMETHODs to the specifications of the ACMETHODs to determine, based on the specifications, at least one anomaly, each of the at least one anomaly representing a missing authorization in the web application code or inconsistent authorization in the web application code;
   marking, by the at least one processor, each of the at least one anomaly as an error based on an analysis of the at least one anomaly; and
   outputting, by the at least one processor, the at least one anomaly or a reason for why the one at least one anomaly is an error.

8. The method of claim 7, further comprising:
   determining, by the at least one processor, an approach to correct the error; and
   outputting, by the at least one processor, the approach.

9. The method of claim 7, wherein each comparison of the specification of an NACMETHOD to the specification of an ACMETHOD is performed in response to determining that the NACMETHOD and ACMETHOD access at least one same variable type.

10. The method of claim 7, further comprising:
    determining, by the at least one processor, a set of security-sensitive operations performed by the ACMETHODs; and
    marking, by the at least one processor, each security-sensitive operation in the specification of each ACMETHOD that performs the security-sensitive operations,
    wherein each security sensitive operation is a method call within the ACMETHOD that performs the security-sensitive operation.

11. The method of claim 10, wherein the ACMETHODs are identified based on at least one of a configuration file, annotations, or programmatic application programming interfaces.

12. A computing device for static code analysis comprising:
    at least one processor; and
    a machine-readable storage medium storing instructions that, when executed by the at least one processor, cause the at least one processor to:
    analyze web application code to identify, in the web application code, methods that have authorization checks associated, the identification being based on at least one of a configuration file, annotations, or programmatic application programming interfaces;
    associate the identified methods as authorization check methods (ACMETHODs) and one or more non-identified methods of the web application code as non-authorization check methods (NACMETHODs);
    generate specifications for the ACMETHODs and the NACMETHODs, wherein each specification includes a list of methods, variables, and classes;
    compare the specifications of the NACMETHODs to the specifications of the ACMETHODs to determine, based on the specifications, at least one anomaly, each of the at least one anomaly representing a missing authorization in the web application code or inconsistent authorization in the web application code;
    mark each of the at least one anomaly as an error based on an analysis of the at least one anomaly; and
    output the at least one anomaly or a reason for why the one at least one anomaly is an error.

13. The computing device of claim 12, wherein the operations further comprise:
    determining an approach to correct the error; and
    outputting the approach.

14. The computing device of claim 12, wherein each comparison of the specification of an NACMETHOD to the specification of an ACMETHOD is performed in response to determining that the NACMETHOD and ACMETHOD access at least one same variable type.

* * * * *

UNITED STATES PATENT AND TRADEMARK OFFICE
CERTIFICATE OF CORRECTION

PATENT NO. : 9,171,168 B2  
APPLICATION NO. : 14/041365  
DATED : October 27, 2015  
INVENTOR(S) : O'Neil et al.

Page 1 of 1

It is certified that error appears in the above-identified patent and that said Letters Patent is hereby corrected as shown below:

In the Specification:

Column 1, line 56, delete "using," and insert -- using --, therefor.

Column 2, line 17, delete "output," and insert -- output --, therefor.

Column 3, line 4, delete "hasIpAddresse" and insert -- hasIpAddress --, therefor.

Column 3, line 65, delete "deletelisr()" and insert -- deleteUser() --, therefor.

Column 4, line 25, delete "comparing," and insert -- comparing --, therefor.

Column 4, line 39, delete "CocktailSeryiceImpl" and insert -- CocktailServiceImpl --, therefor.

Column 4, line 41, delete "ArrayList<Cocktail>():" and insert -- ArrayList<Cocktail>(); --, therefor.

Column 4, line 47, delete "cocktail.remove(int);" and insert -- cocktails.remove(int); --, therefor.

Column 4, line 48, delete "returncocktail;}}" and insert -- return cocktail;}} --, therefor.

Column 8, line 2, delete "may be" and insert -- may be, --, therefor.

In the Claims:  
Column 10, line 13, Claim 10, delete "operations," and insert -- operation, --, therefor.

Signed and Sealed this  
Nineteenth Day of April, 2016

Michelle K. Lee  
*Director of the United States Patent and Trademark Office*